United States Patent [19]

Suzuki

[11] Patent Number: 4,619,152

[45] Date of Patent: Oct. 28, 1986

[54] TRANSMISSION OPERATING DEVICE

[75] Inventor: Kazuhiro Suzuki, Nishinomiya, Japan

[73] Assignee: Nippon Cable System, Inc., Takarazuka, Japan

[21] Appl. No.: 768,999

[22] Filed: Aug. 26, 1985

[30] Foreign Application Priority Data

Sep. 18, 1984 [JP] Japan .............................. 59-195373
Oct. 17, 1984 [JP] Japan .............................. 59-217879

[51] Int. Cl.$^4$ ............................................. G05G 9/16
[52] U.S. Cl. ................... 74/473 R; 74/473 P; 74/501 R
[58] Field of Search .......... 74/473 R, 473 P, 471 XY, 74/491, 501.6

[56] References Cited

U.S. PATENT DOCUMENTS

4,152,950  5/1979  Langford ...................... 74/473 R X
4,238,972 12/1980  Hemens ............................. 74/473 P
4,459,870  7/1984  Gill et al. ........................ 74/471 XY Primary Examiner—Allan D. Herrmann
Attorney, Agent, or Firm—Armstrong, Nikaido, Marmelstein & Kubovcik

[57] ABSTRACT

A transmission operating device for performing a shifting operation and a selecting operation of a transmission by pushing or pulling two inner wires of two control cables, comprising: a change speed lever; a connecting arm with which the two inner wires are connected at both ends of the arm; and a cylindrical casing provided at a middle point between the two points where the two inner wires are connected with the connecting arm, wherein the change speed lever is perpendicularly provided to the connecting arm by the cylindrical casing, the connecting arm is made to move in the direction that the inner wires are pushed or pulled by operating the change speed lever in one direction and is made to swing in the direction perpendicular to the direction that the inner wires are pushed or pulled by operating the change speed lever in the other direction, and the connecting arm has a rotational center so that the swinging motion of the connecting arm in the direction perpendicular to the direction that the inner wires are pulled or pushed is changed into a motion that the connecting arm rotates around the rotational center in a plane substantially parallel to the two inner wires of the two control cables. According to the transmission operating device using control cables of the present invention, a driver can operate the device without feeling a physical disorder, since the selecting operation and the shifting operation can be performed by obeying to the generally used operational form.

7 Claims, 12 Drawing Figures

TRANSMISSION OPERATING DEVICE

BACKGROUND OF THE INVENTION

The present invention relates to a transmission operating device and, more particularly, to a transmission operating device using control cables as a means for transmitting an operational force.

A control cable comprises fundamentally a flexible conduit and a flexible inner wire comprising a strand of steel wire, which is slidably inserted into the conduit, and is constructed so as to transmit a push or pull load acted on one end of the inner wire to the other end in order to operate a remote driven device. In general, rods are connected with both ends of the inner wire, respectively, in the state that the rods are partially inserted into guide pipes which are pivotally connected with both ends of the conduit. However, the rods and the guide pipes are ignored in the specification in order to simplify the description.

A transmission operating device using control cables is recently used as a means for remotely operating a gear transmission in a vehicle such as a front-wheel-drive light motorcar having a front engine and a rear-wheel-drive bus or truck having a rear engine. According to such a transmission operating device, weight and cost thereof are reduced and assembling work is made easy.

Such a transmission operating device has two control cables arranged parallel to each other. When the inner wires of the control cables are pushed or pulled in the same direction at the same time, a shifting operation is performed. Further, when the inner wires are pushed or pulled in the reverse direction with each other at the same time, a selecting operation is performed.

In conventional transmission operating devices using two control cables, a connecting arm, extending in a horizonal plain, with which the two inner wires are connected at both ends of the arm is rotated around a vertical axis at a middle point between the both ends in order to push or pull the inner wires in the reverse direction with each other at the same time. Then, a change speed lever for operating the connecting arm is also generally constructed so as to rotate around the axis of the lever.

In a driving side of such a conventional device, a driver is apt to feel a great physical disorder, since the shift pattern of the change speed lever is different from generally used shift patterns that the change speed lever is operated in two directions perpendicular to each other, such as H-shape.

Further, in a driven side of the device, a mechanism for transmitting an operational force of the device becomes complicated, and the number of parts of the mechanism becomes increased, since the selecting operation is performed based on a rotational motion of a shift rod for operating shift forks of the transmission. Therefore, a range of applying the mechanism to transmissions is limited to special uses and, further, becomes narrow.

A object of the present invention is to provide a transmission operating device constructed so as to operate the change speed lever in two directions perpendicular to each other, and being capable of being applied to various transmissions.

Another object of the present invention is to provide a transmission operating device being constructed so as to directly perform a selecting operation by pivotally inclining a shift rod for operating shift forks, so that the mechanism can be simplified, and being capable of being applied to various transmissions.

SUMMARY OF THE INVENTION

According to the present invention, there is provided a transmission operating device constructed so as to perform a shifting operation and a selecting operation of a transmission by pushing or pulling two inner wires of two control cables arranged parallel to each other, comprising: a change speed lever being supported so as to be operated in two directions perpendicular to each other and not to rotate around the axis of the lever; a connecting arm with which the two inner wires are connected at both ends of the arm; and a cylindrical casing provided at a middle point between the two points where the two inner wire are connected with the connecting arm, wherein the change speed lever is perpendicularly provided to the connecting arm by rotatably inserting a lower portion of the change speed lever into the cylindrical casing, the connecting arm is made to move in the direction that the inner wires are pushed or pulled by operating the change lever in one direction and is made to swing in the direction perpendicular to the direction that the inner wires are pushed or pulled by operating the change speed lever in the other direction perpendicular to the one direction, and the connecting arm has a rotational center so that the swinging motion of the connecting arm in the direction perpendicular to the direction that the inner wires are pushed or pulled is changed into a motion that the connecting member rotates around the rotational center in a plane substantially parallel to the two inner wires of the two control cables.

When the change speed lever is operated in one direction, the connecting arm operated forward or backward so that the two inner wires are pushed or pulled in the same direction at the same time. Therefore, a shifting operation (a selecting operation) can be performed. On the other hand, when the change speed lever is operated in the other direction perpendicular to the one direction, the connecting arm is rotated around the rotational center and the both connecting point of the two inner wires changes their positions in the reverse direction so that the two inner wires are pushed or pulled in the reverse direction with each other at the same time. Therefore, the selecting operation (the shifting operation) can be performed.

Further, according to the present invention, there is provided a transmission operating device using two control cables, of which two inner wires are pushed or pulled in the same or reverse direction with each other at the same time, as a means for transmitting an operational force, comprising: a connecting arm with which the two inner wires are connected at both ends of the arm; a cylindrical casing perpendicularly provided to a middle point of the connecting arm; and a shift rod being supported at its middle portion so as to be pivotally inclined by means of a ball joint provided to a frame, and not to rotate around an axis of itself, wherein one end of the shift rod is rotatably inserted into the cylindrical casing, the other end of the shift rod is engaged with engaging portions of at least two shift forks arranged in a row, and the connecting arm has a rotational center at a position apart from the axis of the cylindrical casing and apart from two points where the two inner wires are connected with the connecting arm.

When the two inner wires are pushed or pulled in the reverse direction with each other at the same time by operating the change speed lever, the connecting arm rotates around the rotational center. Following to the motion, the shift rod partically inserted into the cylindrical casing is pivotally inclined in the transverse direction with respect to the ball joint of the shift rod. Therefore, the operation for selecting the shift forks is performed. When the two inner wires are pushed or pulled in the same direction by operating the change speed lever, the connecting arm moves forward or backward. Following to the motion, the shift rod is pivotally inclined in the longitudinal direction with respect to the ball joint of the shift rod. Therefore, the operation for shifting one of the shift forks is performed.

The above objects and advantages of the present invention will become apparent from the following description with the accompanying drawings.

DETAILED DESCRIPTION

Figure 1:
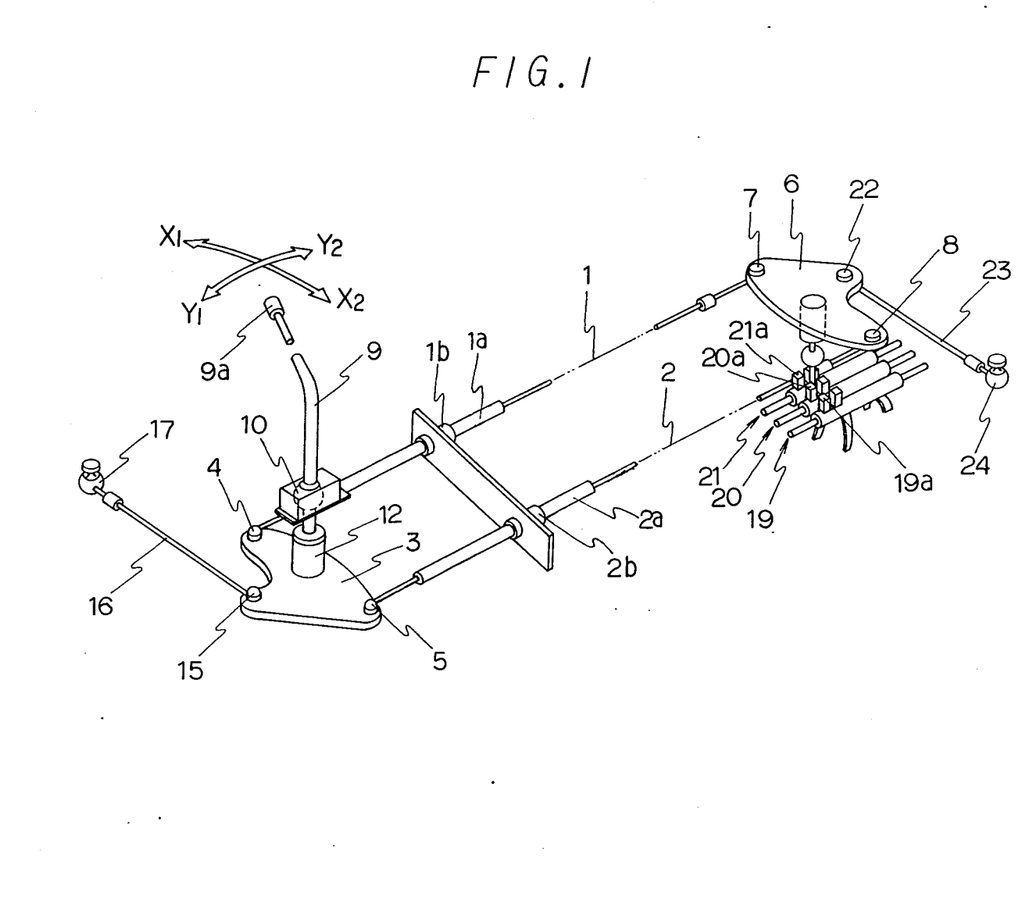
FIG. 1 is a perspective view showing an embodiment of a transmission operating device of the present invention.

In FIG. 1 showing an embodiment of a transmission operating device of the present invention, numerals 1, 2 indicate inner wires to be pushed or pulled. Conduits 1a, 2a, into which the inner wires 1, 2 are slidably inserted, respectively, are arranged parallel to each other at a proper place in a body of a vehicle by fixing the conduits 1a, 2a to a frame of the body via cable caps 1b, 2b at a desired position. As shown in FIG. 1, one end of the inner wire 1 is connected with one end of a connecting arm 3 of a driving side of the device by means of a ball joint 4, and the other end of the inner wire 1 is connected with one end of a connecting arm 6 of a driven side of the device by means of a ball joint 7. Similar to the inner wire 1, one end of the inner wire 2 is connected with the other end of the connecting arm 3 by means of a ball joint 5, and the other end of the second wire 2 is connected with the other end of the connecting arm 6 by means of a ball joint 8.

A structure of the driving side of the device is described below. Numeral 9 indicates a change speed lever. The change speed lever 9 has a grip 9a at its top end. The change speed lever 9 is supported on a frame at its middle portion by means of a ball joint 10 of which outer member is fixed to the frame. Therefore, the change speed lever 9 can be operated in the direction of Arrow $Y_1$ or Arrow $Y_2$ and in the direction of Arrow $X_1$ or Arrow $X_2$.

Figure 3:
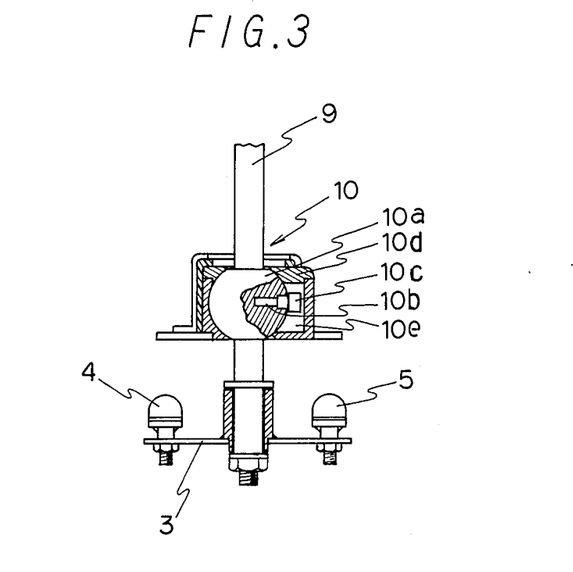
FIG. 3 a partially cutaway side view showing the driving side of the device shown in FIG. 1.

The ball joint 10 is provided with a mechanism for preventing the change speed lever 9 from rotating around the axis of the lever 10. As shown in FIG. 3, the mechanism comprises a roller 10c provided to one end of a pin-like member 10b planted in a ball portion 10a, and a guiding groove 10e formed in a socket 10d to be engaged with the ball portion 10a for guiding the roller 10c extending in the vertical direction. However, the mechanism does not prevent the change speed lever 9 from being operated in the direction of Arrow $Y_1$ or Arrow $Y_2$ (Arrow $X_1$ or Arrow $X_2$) after operating the change speed lever 9 in the direction of Arrow $X_1$ or Arrow $X_2$ (Arrow $Y_1$ or Arrow $Y_2$).

Figure 2:
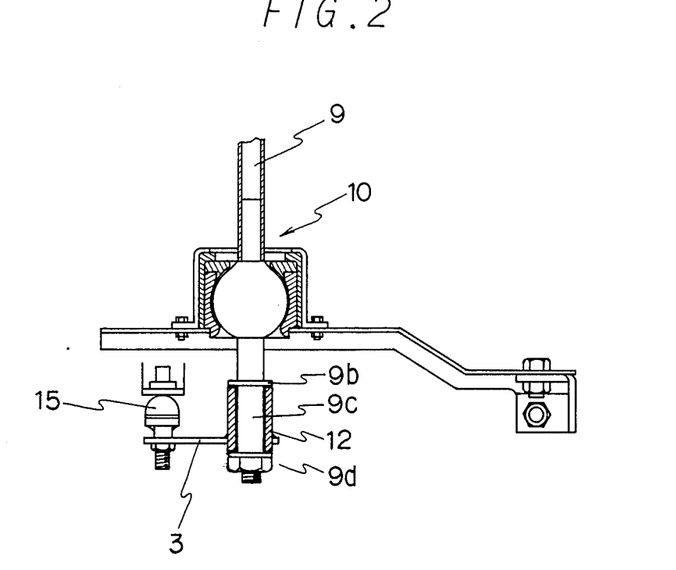
FIG. 2 is a partially cutaway front view showing a driving side of the device shown in FIG. 1.

As shown in FIGS. 2 and 3, the change speed lever 9 has a shaft portion 9c to its lower end via a collar 9b. A cylindrical casing 12 is perpendicularly fixed to the connecting arm 3 at a middle point between the ball joints 4, 5. The shaft portion 9c of the change speed lever 9 is inserted into the cylindrical casing 12. The shaft portion 9c can rotate within the cylindrical casing 12 around the axis of the shaft portion 9c. The connecting arm 3 is perpendiculary provided to the lower end of the change speed lever 9 by supporting the cylindrical casing 12 between the collar 9b and a nut 9d, as shown in FIGS. 2 and 3.

A swinging rod 16 is connected with the connecting arm 3 at the position of substantially the same distance from the ball joints 4, 5 and apart from an axis of the cylindrical casing 12 by means of a ball joint 15. A length of the swinging rod 16 is sufficiently long, as described below, and extends in the direction perpendicular to the direction that the change speed lever 9 is operated in the direction of Arrow $Y_1$ or Arrow $Y_2$. The other end of the swinging rod 16 is connected with a frame by a ball joint 17.

Figure 4A:
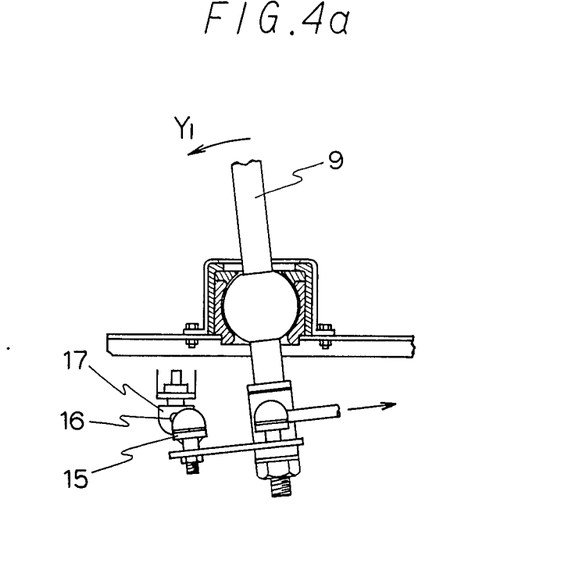
FIGS. 4a and 4b are views for illustrating movements of the driving side of the device during a shifting operating, respectively.
Figure 4B:
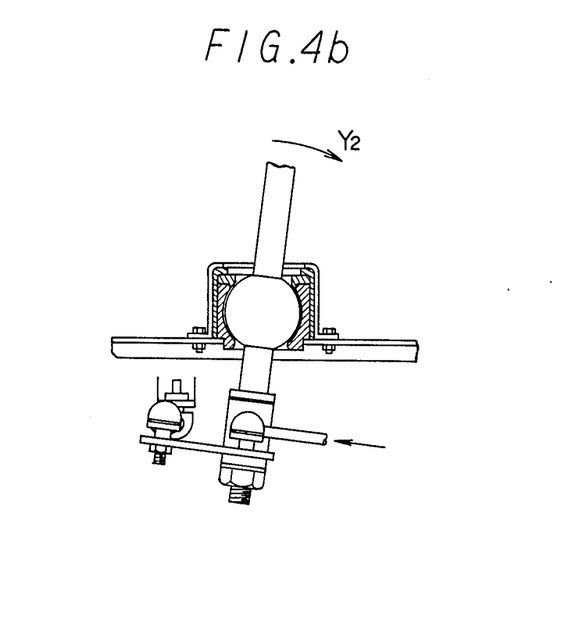

The operation of the driving side of the device is described below. As shown in FIG. 4a, when the change speed lever 9 is operated in the direction of Arrow $Y_1$, the connecting arm 3 pushes the inner wires 1, 2 at the same time. As shown in FIG. 4b, when the change speed lever 9 is operated in the direction of Arrow $Y_2$, the connecting arm 3 pulls the inner wires 1, 2 at the same time. In those cases, the swinging rod 16 swings with respect to the ball joint 17 following to the movement of the connecting arm 3 and, therefore, the ball joint 15 is pulled so as to rotate the connecting arm 3 around the axis of the cylindrical casing 12. However, the rotational motion of the connecting arm 3 around the axis of the cylindrical casing 12 can be substantially ignored, since the ball joint 15 moves on a circumference of a circle of which radius is a length of the swinging rod 16 (the length of the swinging rod 16 is sufficiently long). Therefore, a displacement of the inner wire 1 is substantially equal to that of the inner wire 2.

Figure 5:
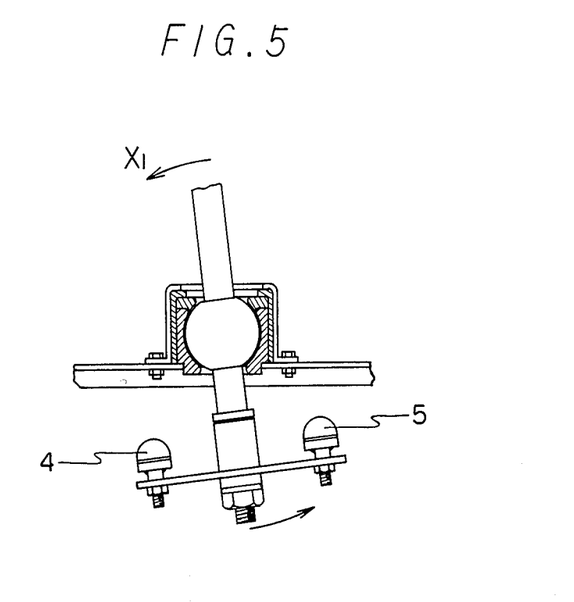
FIG. 5 is a view for illustrating a movement of the driving side of the device during a selecting operation.
Figure 6:
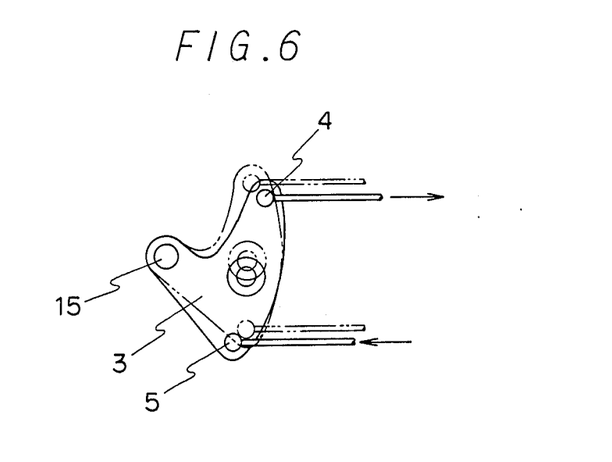
FIG. 6 is a view for illustrating a movement of a connecting arm 3 during the selecting operation.

As shown in FIG. 5, when the change speed lever 9 is operated in the direction of Arrow $X_1$, the connecting arm 3 rotates around the vertical axis at the ball joint 15 and swings with respect to the ball joint 10. That is to say, the connecting arm 3 rotates in the clockwise direction as shown in FIG. 6, since the connecting arm 3 is connected with the frame via the ball joint 15, the swinging rod 16 and the ball joint 17. As a result, the inner wire 1 is pushed and the inner wire 2 is pulled at the same time. In that case, the rotational motion of the connecting arm 3 around the vertical axis at the ball joint 15 cannot be prevented, since the inner wires 1, 2 and the swinging rod 16 are connected with the connecting member 3 by means of the ball joints. Further, the shaft portion 9c of the change speed lever 9 is rotatably inserted into the cylindrical casing 12 and, therefore, the rotational motion of the connecting arm 3 around the vertical axis at the ball joint 15 can be performed without any compulsion. When the change speed lever 9 is rotated in the direction of Arrow $X_2$, the connecting arm 3 performs a rotational motion and a swinging motion, so that the inner wire 1 is pulled and the inner wire 2 is pushed at the same time.

Figure 7:
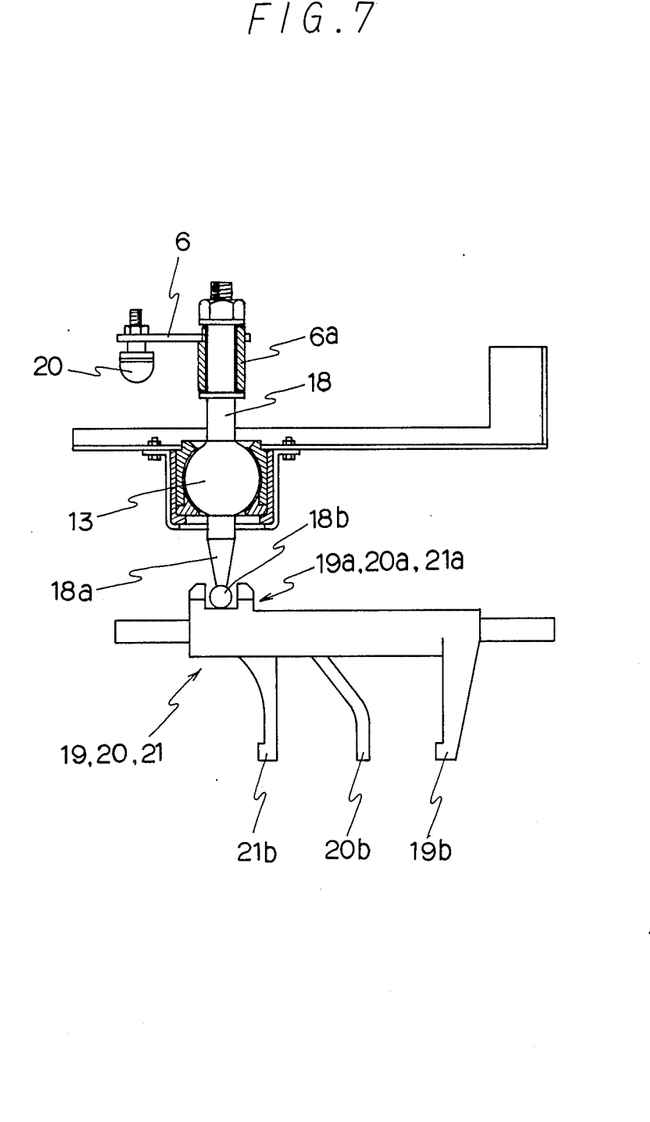
FIG. 7 is a partially cutaway front view showing a driven side of the device shown in FIG. 1.
Figure 8:
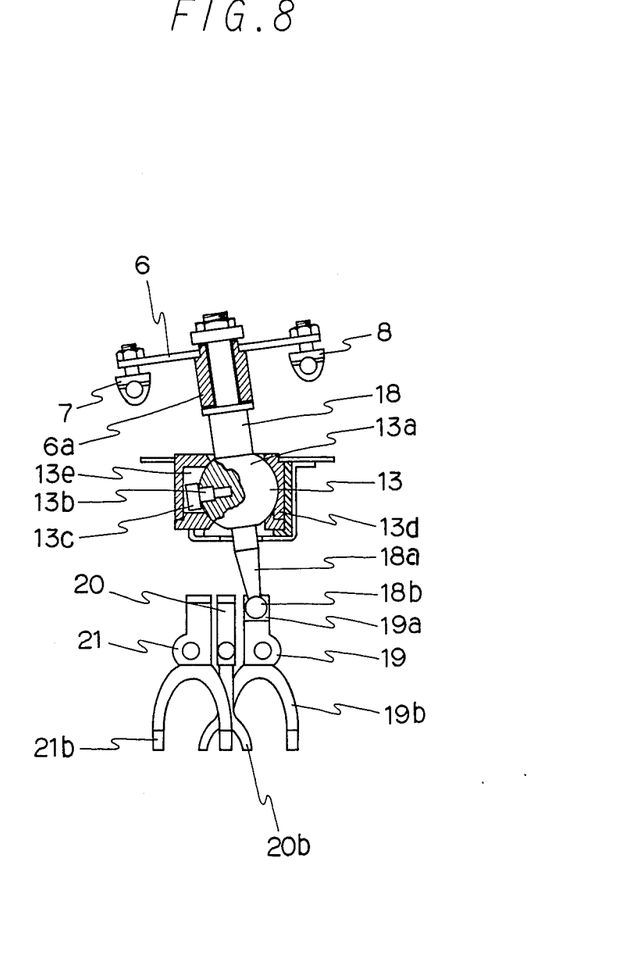
FIG. 8 is a partially cutaway side view showing the driven side of the device shown in FIG. 1.

A structure of the driven side of the device is described below. As shown in FIGS. 7 and 8, a cylindrical casing 6a is perpendicularly fixed to a connecting arm 6 at a middle point between the ball joints 7, 8, and a shaft portion of a shift rod 18, provided at an upper end of the shaft rod 18 via a collar, is inserted into the cylindrical casing 6a so that the shift rod 18 can rotate around the axis of the rod 18, similar to the driving side. The shift rod 18 is supported on a frame at its middle portion by means of a ball joint 13. In that case, the shift rod 18 cannot rotate around the axis of the rod 18. That is to say, the ball joint 13 is provided with a mechanism for preventing the shift rod 18 from rotating around the axis of the rod 18. The mechanism comprises a roller 13c provided to one end of a pin-like member 13b planted in a ball portion 13a of the ball joint 13, and a guiding groove 13e formed in a socket to be engaged with the ball portion 13a for guiding the roller 13c in the vertical direction. Therefore, the shift rod 18 is constructed so as not to rotate around the axis of the rod 18. However, the mechanism does not prevent the shift rod 18 from being pivotally inclined in the direction of Arrow $Y_1$ or Arrow $Y_2$ (Arrow $X_1$ or Arrow $X_2$) after pivotally inclining the shift rod 18 in the direction of Arrow $X_1$ or Arrow $X_2$ (Arrow $Y_1$ or Arrow $Y_2$).

Further, the shift rod 18 is downwardly tapered at its lower side and provided with a spherical portion 18b at its tapered lower end, as shown in FIGS. 7 and 8.

On the other hand, shift forks 19, 20, 21 are arranged in a row below the shift rod 18. The shift forks 19, 20, 21 have engaging portions 19a, 20a, 21a, which can be engaged with a spherical portion 18b of the shift rod 18, at its upper ends, respectively. Further, the shift forks 19, 20, 21 have fork members 19b, 20b, 21b, respectively, as shown in FIGS. 7 and 8. When the shift fork is moved in the axial direction thereof, a gear or a jaw clutch within a gear transmission (not shown in the drawings) can be moved to a desired position on a main shaft.

One end of a swinging rod 23 is connected with the connecting arm 6 at a position of substantially the same distance from the ball joints 7, 8 and apart from an axis of the cylindrical casing 6a by means of a ball joint 22. The other end of the swinging rod 23 is connected with a frame by means of a ball joint 24. When the inner wire 1 is pushed (pulled) and the inner wire 2 is pulled (pushed) at the same time, the connecting arm 3 rotates around a vertical axis at the ball joint 22. Further, when the inner wires 1, 2 are pushed (pulled) in the same direction at the same time, the connecting arm 6 is rotated around a vertical axis at the ball joint 24. However, this motion of the connecting arm 6 with respect to the ball joint 24 can be regarded as a rectilinear motion, since the swinging rod 23 is sufficiently long.

The operation of the driven side of the device is described below. When the connecting arm 6 is rotated around the vertical axis at the ball joint 22, the shift rod 18 is pivotally inclined in the transverse direction with respect to the ball joint 13. In that case, the motion of the connecting arm 6 is not prevented, since the connecting arm 6 can rotate around the shift rod 18 of which shaft portion is rotatably inserted into the cylindrical casing 6a. As a result, the spherical portion 18b of the shift rod 18 can move within the engaging portions 19a, 20a, 21a of the shift forks 19, 20, 21 and, therefore, the selecting operation can be performed. FIG. 8 shows the state that the shift fork 19 is selected by pivotally inclining the shift rod 18.

When the connecting arm 6 is rotated around the vertical axis at the ball joint 24, the shift rod 18 is pivotally inclined in the longitudinal direction with respect to the ball joint 13. Then, the spherical portion 18b of the shift rod 18 is engaged with one of the engaging portions 19a, 20a, 21a of the shift forks, so that one of the shift forks 19, 20, 21 slides in the axial direction thereof and, therefore, the shifting operation is performed.

Figure 9:
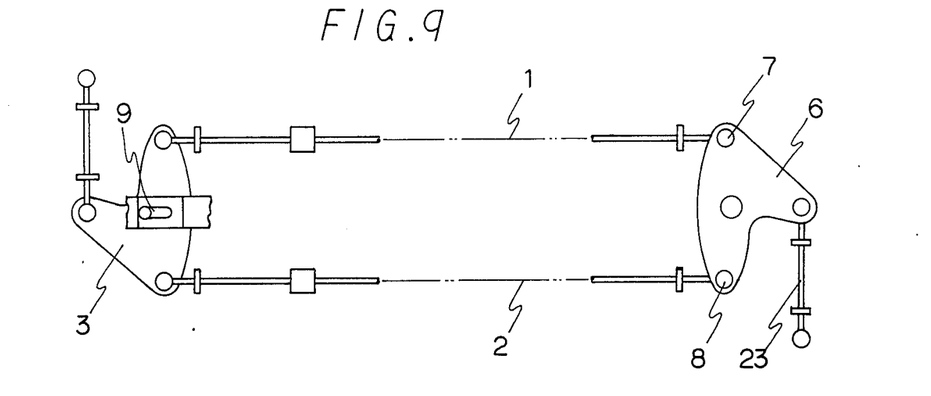
FIG. 9 is a plan view showing the device shown in FIG. 1 at a neutral position.
Figure 10:
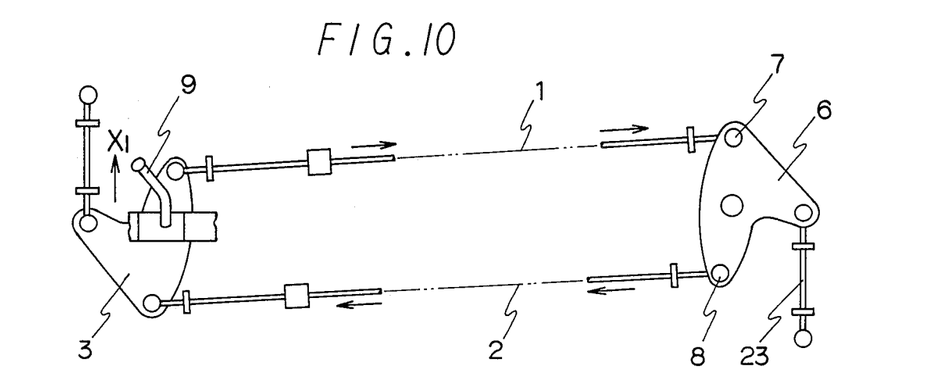
FIG. 10 is a plan view showing a movement of the device shown in FIG. 1 during the selecting operation.

The operation of all the transmission operating device shown in FIG. 1 is described below. FIG. 9 shows a state that the change speed lever 9 is located at a neutral position. Further, FIG. 10 shows a state that the change speed lever 9 is operated in the direction of Arrow $X_1$ in FIG. 1 in order to perform the selecting operation. When the connecting arm 3 is rotated around the vertical axis at the ball joint 15 in the clockwise direction so that the inner wire 1 can be pushed and the inner wire 2 can be pulled, the connecting arm 6 is rotated around the vertical axis at the ball joint 22 in the clockwise direction and the shift rod 18 is pivotally inclined in the transverse direction. Therefore, the shift fork 19 is selected. When operating the change speed lever in the direction of Arrow $X_2$, the connecting arm 3 is rotated around the vertical axis at the ball joint 15 in the counterclockwise direction. As a result, the shift fork 21 is selected. At the neutral position, the shift fork 20 is selected.

Figure 11:
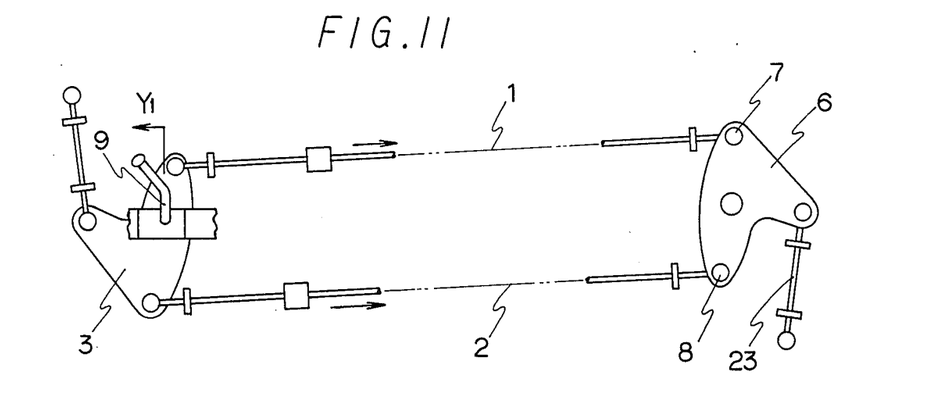
FIG. 11 is a plan view showing a movement of the device shown in FIG. 1 during the shifting operation.

As shown in FIG. 11, when the change speed lever 9 is operated in the direction of Arrow $Y_1$ after the selecting operation is performed, the connecting arm 3 acts so as to push the inner wires 1, 2 at the same time. Therefore, the connecting arm 6 moves the shift fork 19 via the shift rod 18 and, therefore, the shifting operation is performed. When operating the change speed lever 9 in the direction of Arrow $Y_2$, the shifting operation is released. Other shift forks 20, 21 are also operated similar to the shift fork 19.

Though an embodiment of the present invention is described above, the present invention is not limited to the embodiment. For example, as shown in FIG. 1, if the driven side is constructed so as to be similar to the driving side in shape, mechanism and measurements, offsetting amounts of the inner wires 1, 2 caused by the motions of the connecting arms 3, 6, i.e. the difference between a pushed amount (a pulled amount) of the inner wire 1 and a pulled amount (a pushed amount) of the inner wire 2 can be advantageously ignored. However, the device of the present invention is not limited to the structure that the driven side is constructed so as to be similar to the driving side. That is to say, any mechanism that a shifting operation (a selecting operation) is performed by pushing or pulling the inner wires in the same direction and that the selecting operation (the shifting operation) is performed by pushing and/or pulling the inner wires in the reverse direction with each other can be employed.

Further, the selecting operation may be performed by a well-known outer lever constructed so as to operate the inner wires 1, 2 in the reverse direction with each other, instead of the structure shown in FIG. 1. In this way, verious modifications can be applied to the device of the present invention.

According to the transmission operating device using control cables of the present invention, a driver can operate the device without feeling a physical disorder, since the selecting operation and the shifting operation can be performed by obeying to the generally used operational form that the change speed lever is operated in two directions perpendicular to each other.

Further, according to the device of the present invention, the selecting operation can be directly performed by pivotally inclining the shift fod 18, so that the structure is simplified.

Such a device can be applied to various transmissions of a vehicle and the like.

What is claimed is:

1. A transmission operating device constructed so as to perform a shifting operation and a selecting operation of a transmission by pushing or pulling two inner wires of two control cables arranged parallel to each other, comprising:
    (a) a change speed lever being supported so as to be operated in two directions perpendicular to each other and not to rotate around the axis of the lever;
    (b) a connecting arm with which the two inner wires are conneced at both ends of the arm; and
    (c) a cylindrical casing provided at a middle point between the two points where the two inner wires are connected with the connecting arm,
    wherein the change speed lever is perpendicularly provided to the connecting arm by rotatably inserting a lower portion of the change speed lever into the cylindrical casing, the connecting arm is made to move in the direction that the inner wires are pushed or pulled by operating the change speed lever in one direction and is made to swing in the direction perpendicular to the direction that the inner wires are pushed or pulled by operating the change speed lever in the other direction perpendicular to the one direction, and the connecting arm has a rotational center so that the swinging motion of the connecting arm in the direction perpendicular to the direction that the inner wires are pulled or pushed is changed into a motion that the connecting arm rotates around the rotational center in a plane substantially parallel to the two inner wires of the two control cables.

2. The device of claim 1, wherein the rotational center is located apart from the axis of the cylindrical casing and apart from the two points at which the inner wires are connected with the both ends of the connecting arm, and one end of a swinging rod of which the other end is pivotally connected with a frame is connected with the connecting arm by means of a ball joint at the rotational center.

3. A transmission operating device using two control cables, of which two inner wires are pulled or pushed in the same or reverse direction with each other at the same time, as a means for transmitting an operational force, comprising:
    (a) a connecting arm with which the two inner wires are connected at both ends of the arm;
    (b) a cylindrical casing perpendicularly provided to a middle point of the connecting arm; and
    (c) a shift rod being supported at its middle portion so as to be pivotally inclined by means of a ball joint provided to a frame, and not to rotate around the axis of the rod,
    wherein one end of the shift rod is rotatably inserted into the cylindrical casing, the other end of the shift rod is engaged with engaging portions of at least two shift forks arranged in a row, and the connecting arm has a rotational center at a position apart from the axis of the cylindrical casing and apart from the two points where the two inner wires are connected with the connecting arm.

4. The device of claim 3, wherein one end of a swinging rod of which the other end is pivotally connected with a frame is connected with the connecting arm by means of a ball joint at the rotational center.

5. A transmission operating device constructed so as to perform a shifting operation and a selecting operation of a transmission by pushing or pulling two inner wires of two control cables arranged parallel to each other, at a driving side of the device, comprising:
    (a) a change speed lever being supported so as to operate in two directions perpendicular to each other and not to rotate around the axis of the lever;
    (b) a first connecting arm with which the two inner wires are connected at both ends of the arm; and
    (c) a first cylindrical casing provided at a middle point between the two points where the two inner wires are connected with the first connecting arm,
    wherein the change speed lever is perpendicularly provided to the first connecting arm by rotatably inserting a lower portion of the change speed lever into the first cylindrical casing, the first connecting arm is made to move in the direction that the inner wires are pushed or pulled by operating the change speed lever in one direction and is made to swing in the direction perpendicular to the direction that the inner wires are pushed and pulled by operating the change speed lever in the other direction perpendicular to the one direction, and the first connecting arm has a first rotaional center so that the swinging motion of the first connecting arm in the direction perpendicular to the direction that the inner wires are pulled or pushed is changed into a motion that the first connecting arm rotates around the first rotational center in a plane substantially parallel to the two inner wires of the two control cables and,
    further, at a driven side of the device, comprising,
    (d) a second connecting arm with which the two inner wires are connected at both ends of the arm;
    (e) a second cylindrical casing perpendicularly provided to a middle point of the connecting arm; and
    (f) a shift rod being supported at its middle portion so as to pivotally incline by means of a ball joint provided to a frame, and not to rotate around the axis of the rod,
    wherein one end of the shift rod is rotatably inserted into the second cylindrical casing, the other end of the shift rod is engaged with engaging portions of at least two shift forks arranged in a row, and the second connecting arm has a second rotational center at a position apart from the axis of the cylindrical casing and apart from the two points where the two inner wires are connected with the connecting arm.

6. The device of claim 5, wherein the first rotational center is located apart from the axis of the first cylindrical casing and apart from the two points at which the inner wires are connected with the both ends of the first connecting arm, and one end of a first swinging rod of which the other end is pivotally connected with a frame is connected with the connecting arm by means of a ball joint at the first rotational center.

7. The device of claim 5, wherein one end of a second swinging rod of which the other end is pivotally connected with a frame is connected with the connecting arm by means of a ball joint at the second rotational center.

* * * * *